United States Patent [19]
Bourel et al.

[11] Patent Number: 5,530,756
[45] Date of Patent: Jun. 25, 1996

[54] TELEVISION SCRAMBLING AND DESCRAMBLING METHOD, AND TRANSMITTER AND RECEIVER USING SAID METHOD

[75] Inventors: Guy Bourel, Suresnes; Loïc Potier, Le Kremlin Bicêtre, both of France

[73] Assignee: U.S. Philips Corporation, New York, N.Y.

[21] Appl. No.: 306,058

[22] Filed: Sep. 14, 1994

[30] Foreign Application Priority Data

Sep. 15, 1993 [FR] France ............................ 93 10997

[51] Int. Cl.⁶ ............................................. H04N 7/167
[52] U.S. Cl. .............................................. 380/20; 380/10
[58] Field of Search ....................................... 380/10, 20

[56] References Cited

U.S. PATENT DOCUMENTS 4,636,854  1/1987  Crowther et al. ................. 358/123
4,890,321 12/1989  Seth-Smith et al. ................. 380/20
5,243,650  9/1993  Roth et al. ........................... 380/19

FOREIGN PATENT DOCUMENTS 0196724 10/1990  European Pat. Off. ........ H04N 7/167
0448534  9/1991  European Pat. Off. .

*Primary Examiner*—David C. Cain
*Attorney, Agent, or Firm*—Laurie E. Gathman

[57] ABSTRACT

In a television transmission system comprising an analog video channel scrambled with a control word which is changed occasionally and a NICAM sound channel scrambled with a control word which is also changed occasionally, and different scrambling and modulation circuits having independent clocks for the sound and video signals, a single control word generator is used for the sound and video signals and when this control word is changed for the video signal (17), a bit or a specific group of bits is incorporated in the subsequent sound data packet (18) indicating that a new control word is available, but the new control word will only be used for a subsequent data packet (19).

12 Claims, 2 Drawing Sheets

TELEVISION SCRAMBLING AND DESCRAMBLING METHOD, AND TRANSMITTER AND RECEIVER USING SAID METHOD

BACKGROUND OF THE INVENTION

The invention relates to a scrambling and descrambling method in a system for transmitting and receiving a scrambled television signal comprising an analog video signal and digital sound data transmitted in frequency-division multiplex, in which the analog video signal is transmitted in lines and fields whose starting instants are controlled by a first time base, and the digital sound data are transmitted in the form of successive packets, parts of which are transmitted in an unscrambled form and other parts are transmitted in a scrambled form, the rate of the data being controlled by a second time base which is not synchronous with that for the video signal, while control words used for scrambling and descrambling are changed in the course of time and, when the control word for the video signal is to be changed, the new control word is first determined and transmitted and subsequently a command of using the new word is transmitted to the video part.

The invention also relates to a television transmitter and a receiver for transmitting or receiving signals in accordance with this method.

A television scrambling method as described in the opening paragraph is known from the document EP-A-0 448 534. This document describes a means for scrambling a sound signal in accordance with the NICAM standard. The document does not suggest any means for scrambling the video signal in a corresponding manner.

Based on known means for scrambling a sound signal and other known means for scrambling a video signal, which means are completely independent of each other, the idea of the invention is to simplify the system by a common implementation of certain elements of the scrambling devices.

The invention is based on the recognition that separate pseudo-random generators can nevertheless be initialized with the same control word, provided that particular precautions are taken for the synchronization of the devices.

SUMMARY OF THE INVENTION

The method according to the invention is characterized in that a single device for generating the same control word is used for both the sound signal and the video signal, and a bit or a specific group of bits is incorporated at the transmitter end in the unscrambled part of a sound data packet coming after the packet which is being processed at the moment when the command of using the new word is signified to the video part, indicating that the new control word which has been transmitted must also be used for the sound part for scrambling or descrambling the dam packets which come after the packet in which said bit or specific group of bits has been incorporated.

The method according to the invention is advantageously used in a system in which the sound is transmitted in accordance with the NICAM standard.

One of said packets is preferably constituted by a NICAM frame of 728 bits or by a NICAM sequence of 16 frames of 728 bits.

A television transmitter comprising a video part and a sound part and provided with a digital sound modulator which generates successive digital data packets transmitted by sound carrier modulation and in each of which parts are transmitted in an unscrambled form and other parts are transmitted in a scrambled form, an analog signal generator for the video part which is transmitted by means of a video carrier, first circuits provided with a first time base for generating the video field and line scanning signals and for scrambling the video signals on the basis of control words which are changed in the course of time, second circuits provided with a second time base which is not synchronous with that for the video circuits for generating the digital sound signals and for scrambling these signals on the basis of control words which are changed in the course of time, and means for supplying the new control word to the video part in order to change the video control word, and for giving to this video part the command of changing the control word is characterized in that it is provided with a single control word generator which generates the control word and supplies this word to the sound scrambling circuit as well as to the video scrambling circuit, and means for incorporating a bit or a specific group of bits, indicating that a new control word must be used, in the unscrambled part of a sound data packet coming after the packet which is being processed at the moment when the command of using the new word is given to the video part, and means for using the new control word in the sound part for the sound data packets coming after the packet in which said bit or specific group of bits has been incorporated.

The transmitter according to the invention advantageously comprises a sound modulator of the NICAM type.

A receiver for scrambled television signals comprising a video part and a sound pan and provided with an analog signal demodulator for the video part and a digital signal demodulator for the sound part, different descrambling and demodulation circuits provided with time bases which are mutually unsynchronized for the sound signal on the one hand and the video signal on the other hand, circuits for extracting the control words, for deciphering them and for communicating the new control word and the command of changing the control word to the video descrambling circuit at the required time, is characterized in that, this receiver being intended to receive a signal transmitted by a transmitter according to the invention, it is provided with a circuit for detecting said bit or specific group of bits in the digital sound signal, and with means for using the new control word for descrambling the sound data packets subsequent to the packet in which the indication is found that a new control word must be used.

These and other aspects of the invention will be apparent from and elucidated with reference to the embodiments described hereinafter.

DETAILED DESCRIPTION OF THE PREFERRED EMBODIMENTS OF THE INVENTION

Figure 1:
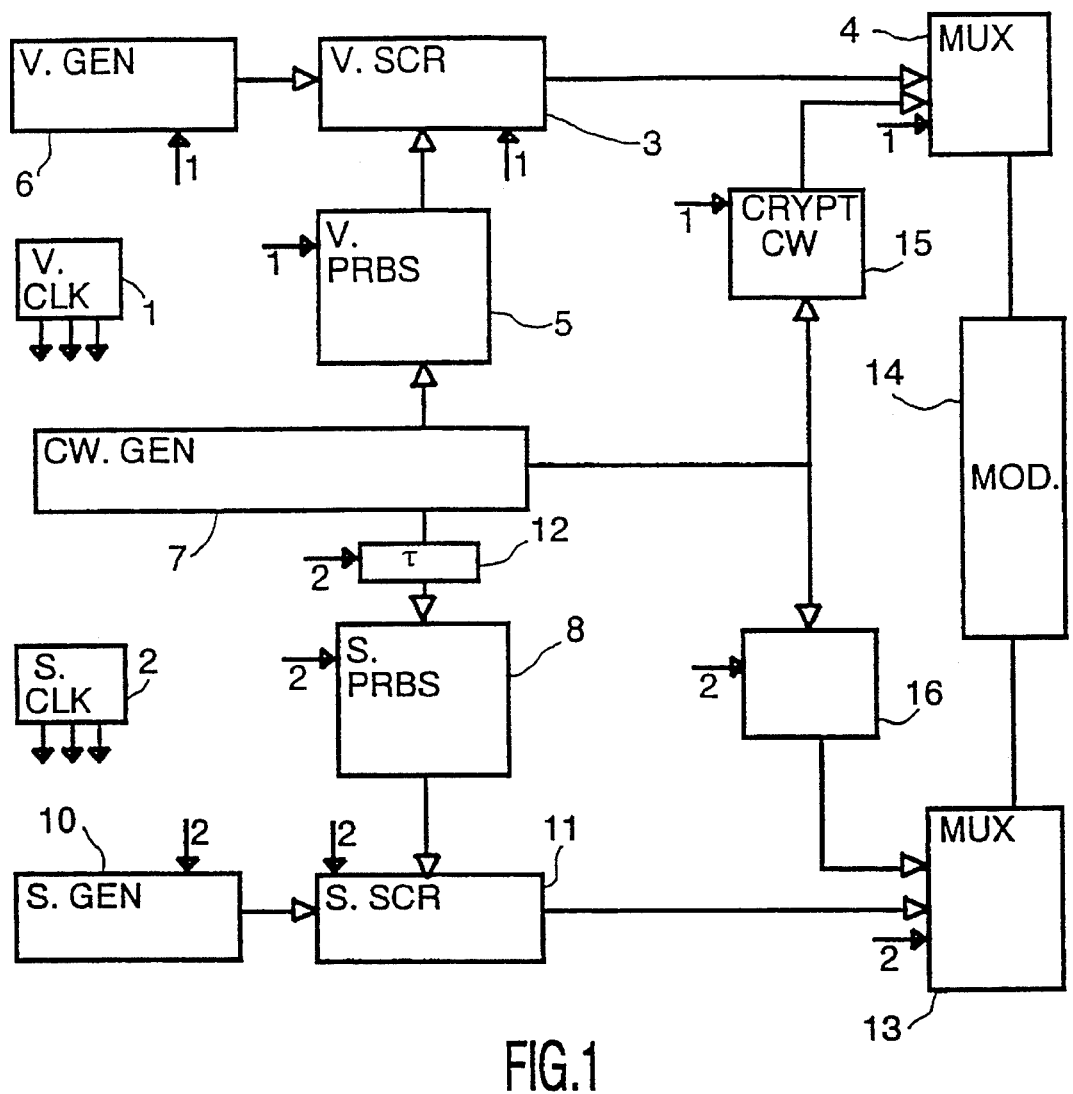
FIG. 1 is a block diagram of a transmitter according to the invention.

The invention will be described on the basis of a television system in which the video signal is transmitted and scrambled in accordance with the PAL standard and in which the sound signal is transmitted and scrambled in accordance with the NICAM standard (short for "Near Instantaneous Companded Audio Modulation"). The NICAM standard, which was the object of a CCIR recommendation project in 1988, is a recent standard but is nevertheless already well known.

It will be evident that the invention is also applicable to systems using other standards such as, for example the SECAM standard for the video signal, or digital modulation methods other than NICAM, provided that the digital sound data are transmitted in the form of successive packets and that parts of each of these packets (header) are transmitted in an unscrambled form and other parts (sound bits) are transmitted in a scrambled form.

A NICAM "frame" is constituted by 64 words each comprising 10 bits plus a parity bit, i.e. a total of 704 bits preceded by a header of 24 bits used for synchronization and control, which header is subdivided into 8 frame-alignment bits, 5 bits defining the application and 11 bits of additional dam. A frame thus comprises 728 bits. A frame has a duration of one millisecond. The frames are arranged in groups of sixteen frames constituting one "sequence". This process is controlled by means of a clock signal at a frequency of 728 kHz. A frame is scrambled by modulo-2 addition of each of the 704 sound data bits to bits from a pseudo-random generator, leaving the header unscrambled. The pseudo-random generator is initialized by a control word generated by another generator which is a purely random generator. This word is transmitted to the receivers in a ciphered form and with the addition of error correction codes which enable the receivers to eventually reconstitute the correct bits by way of an operation which is inverse to that carried out at the transmitter end and by using a pseudo-random generator which is functionally identical to that used at the transmitter end and is initialized by the control word thus transmitted.

A PAL video line has a duration of 64 microseconds, approximately 12 microseconds of which are used for the period referred to as the line retrace time. This process is also controlled by means of a clock signal. The latter has a frequency which is much higher than the line frequency (for example 17.734375 MHz, i.e. 1135 times the line frequency) and its frequency is divided to obtain the latter frequency. Scrambling may be realised in known manner, for example by cutting each line into two parts at a point determined by a digital value furnished by a pseudo-random generator and by inverting these two parts. This is referred to as "circular shift". The signal is transmitted in an analog form. In a field of a frame, approximately twenty lines are hidden during the time referred to as "field blanking period". During this field blanking period, a part of the available time is used for transmitting, inter alia, data concerning the scrambling operation (access control data, control words ciphered upon transmission and deciphered upon reception by means of a known method, keys, etc. ). The control word thus transmitted enables the receivers to determine each cut-off point of the line and to re-establish the lines by means of an operation inverse to that performed at the transmitter end and by using a pseudo-random generator which is identical to that used at the transmitter end and is initialized by the control word.

As the charging of the control word takes a certain time, it is charged before a signal is produced which indicates that a new word must be used. It is also recharged at regular intervals for reasons of reliability and also for enabling receivers switched on during transmission to retrieve the control word rapidly.

The transmitter shown in FIG. 1 comprises a video signal source 6 and an audio signal source 10 supplying NICAM signals. The signals from the video source 6 are supplied via a known video scrambling module 3 and the scrambled signals are applied to a multiplexer 4 which adds the numerical dam, notably those concerning the video scrambling during the field retrace time or in certain useful video lines. A pseudo-random sequence generator 5 furnishes the scrambler 3 with a digital value with which a cut-off point of the line can be determined. All these modules operate in synchronism due to a clock 1 (having, for example a base frequency of 17.734375 MHz) which supplies various synchronizing signals each denoted by means of an arrow "1".

The digital signals from the audio source 10 are supplied via a known audio scrambling module 11 and the scrambled signals are applied to a multiplexer 13 which adds digital data in the header at the start of each field. A pseudo-random sequence generator 8 furnishes the scrambler 11 with bits to be modulo-2 added to 704 digital sound bits. These audio modules operate in synchronism due to a clock 2 (having, for example a base frequency of 728 kHz) which supplies various synchronizing signals each denoted by means of an arrow "2".

A modulator 14 jointly transmits the video and audio signals from the modules 4 and 13, for example on a high-frequency carrier.

The two video and sound parts described above are completely independent of each other. Their clocks 1 and 2 are distinct and no means is provided to ensure any synchronization between them. Moreover, their frequencies have no smallest common divider which would allow their alignment with respect to each other. Therefore, the scrambling means 5, 3 for the video signal on the one hand, and 8, 11 for the sound signal on the other hand, which are based on a precise temporal pace supported for each of them by the clock of the signals considered, are completely independent of each other. Notably their pseudo-random generators 5 and 8 are distinct.

Nevertheless, a single device 7 for generating a control word is provided for both sound and video. It comprises a purely random sequence generator, i.e. completely unpredictable, which provides such a sequence as required for generating a control word. When a new control word is provided under the control of the module 7 itself, this new control word is applied to a module 15 which transforms the word by way of a known ciphering means and adds in equally known manner an error detection code before it is applied to the multiplexer 4 so as to be transmitted to the receivers, and the change is signified in the video part to the pseudo-random generator 5 in such a way that the new control word is used for a future initialization of this pseudo-random generator in known manner. The change is also signified to a module 16 which provides the multiplexer 13 with a signal indicating that a bit or a specific group of bits must be incorporated in the header (preferably in one of the 11 additional data bits) of a sound data packet, and after the new control word has been completely transmitted, this bit or this specific group of bits indicates to the receivers that a new control word is available and is to be used for scrambling or descrambling the scrambled part of the packets. The new control words in the sound part will only be used for a data packet subsequent to that in which said bit or specific group of bits has been incorporated, thanks to a buffer memory 12 which retains the new word during the necessary period and then applies it to the pseudo-random generator 8 for a subsequent packet of bits. Such a packet may be constituted by a NICAM frame, i.e. 728 bits, but also by a NICAM sequence, i.e. 16 frames of 728 bits.

Figure 2:
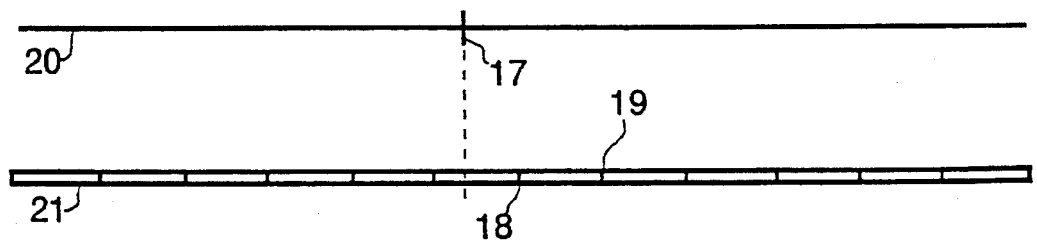
FIG. 2 is a time diagram showing how a control word is changed.

In FIG. 2 the line 20 shows the period of time for the video part. It is supposed that the sequence of changing the control word starts at the instant 17 (the new word has already been transmitted previously). The line 21 shows the period of time for the audio part. The successive elements separated by a vertical bar each represent a packet, i.e. either one frame or 16 frames. The bit or the specific group of bits indicating that a new control word is available is incorporated in the packet starting at 18. The new control word will only be used for the subsequent packet of data starting at 19.

Figure 3:
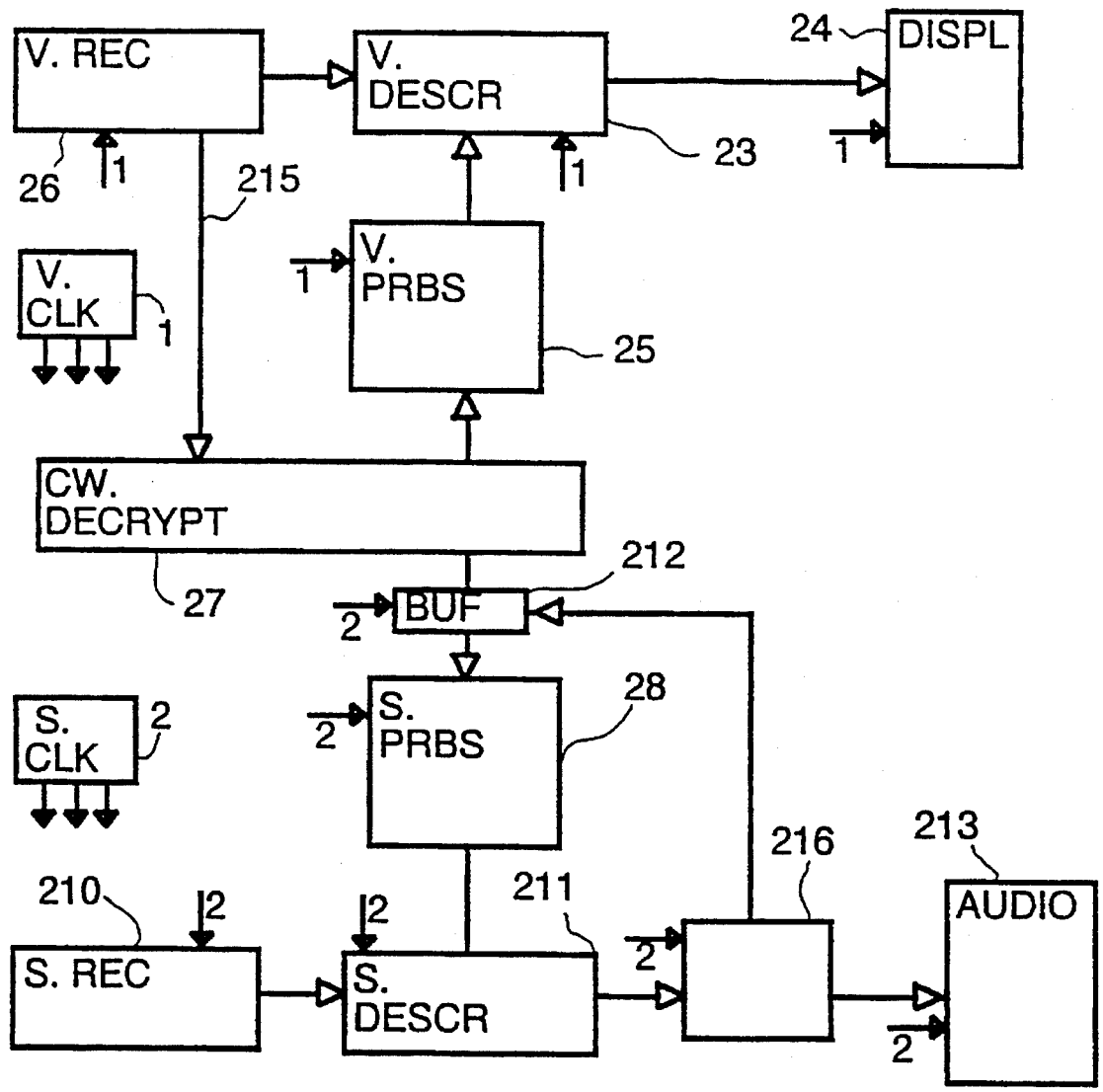
FIG. 3 is a block diagram of a receiver according to the invention.

The receiver shown in FIG. 3 comprises a receiver section 26 for the video signals (demodulation, intermediate frequency and high-frequency circuits supplying the video signals in baseband) and a receiver section 210 for the digital audio signals (demodulation, intermediate frequency and high-frequency circuits supplying the sound signal in a digital form). The section 26 also comprises a circuit which extracts the digital data which are present during the field blanking periods and supplies them on a connection 215.

The signals from the video receiver section 26 are supplied via a known video descrambling module 23 and the descrambled signals are applied to a video display element 24 comprising video circuits and a tube or another means for displaying images. A pseudo-random sequence generator 25, which is functionally identical to the generator 5 of the transmitter, furnishes the descrambler 23 with the digital value which provides the possibility of determining the cut-off point of the line and of re-establishing the normal line. All these modules function in synchronism thanks to a clock 1 (having, for example a base frequency of 17.734375 MHz) which supplies various synchronizing signals each denoted by means of an arrow "1".

The signals from the audio section 210 are supplied via a known audio descrambling module 211 and the descrambled signals are applied to a sound reproduction element 213 comprising a known decoding circuit (D/A converter and other circuits), an amplifier circuit and a loudspeaker or another means for reproducing the sound. A pseudo-random sequence generator 28 furnishes the descrambler 211 with bits to be modulo-2 added to the scrambled part of the digital sound signal so as to descramble said signal. These audio modules function in synchronism thanks to a clock 2 (having, for example a base frequency of 728 kHz) which supplies various synchronizing signals each denoted by means of an arrow "2".

The two video and sound parts are completely independent and the pseudo-random generators 25 and 28 are distinct generators. Nevertheless, a single device 27 for decrypting and restoring the control word received from the receiver section 26 is present for both the sound signal and the video signal. When the command of changing the control word comes, the change is signified in the video part to the pseudo-random generator 25 to which the new control word is applied which will be used for the next initialization of this pseudo-random generator. The new control word is also applied in the sound part to a buffer memory circuit 212 which retains this word during a certain period. In the sound part the change is detected in the contents of the packet header by a module 216 which applies a start signal to the circuit 212 in order that the latter applies the new control word to the pseudo-random generator 28 for the next packet of bits.

It is alternatively possible to transmit the ciphered control word in the sound channel, for example by transmitting the first bit of this word in a position of a packet header, the second bit in the same position of the next packet header and so forth. The circuit 216 would then read, decipher and charge this word in the memory 212 and would apply it to the video part. It may also be transmitted simultaneously in the video channel and in the sound channel.

We claim:

1. A scrambling and descrambling method in a system comprising a transmitter and a receiver, each having a video part and a sound part, making use of respectively an analog video signal and digital sound data transmitted in frequency-division multiplex, the analog video signal being transmitted in the form of lines and fields whose starting instants are controlled by a first time base, the digital sound data being transmitted in the form of successive packets, a first part of each of the successive packets being transmitted in unscrambled form and a second part of each of the successive packets being transmitted in scrambled form, the rate of the digital sound data being controlled by a second time base which is not synchronous with the first time base, said method comprising the steps of:

generating a new control word in the transmitter;

transmitting the new control word to the receiver;

using the new control word for the scrambling and descrambling of the analog video signal after a command of using the new control word has been supplied to the video part of both the receiver and the transmitter;

incorporating at the transmitter a bit or a specific group of bits in the first part of a packet of the successive packets coming after the packet of the successive packets which is being processed when the command of using the new control word is supplied to the video part of the transmitter, the bit or specific group of bits indicating that the new control word is used for the scrambling of the second part of packets which will come later;

using the new control word for the scrambling of the second part of packets of the successive packets coming after the packet in which the bit or group of bits is incorporated;

detecting at the receiver the bit or group of bits in the first part of a packet of the successive packets, indicating that the new control word must be used for the descrambling of the second part of packets which will come later; and using the new control word for the descrambling of the second part of packets of the successive packets coming after the packet in which the bit or group of bits is detected.

2. A method as claimed in claim 1, wherein the digital sound data is transmitted in accordance with the NICAM standard.

3. A method as claimed in claim 2, wherein each of said successive packets is constituted by a NICAM frame.

4. A method as claimed in claim 2, wherein each of said successive packets is constituted by a NICAM sequence.

5. A transmitter for transmitting a scrambled television signal, comprising:

a control word generator for generating a new control word;

a video part for processing an analog video signal, said video part being controlled by a first time base, and comprising:

a video scrambling circuit for scrambling the analog video signal on the basis of a video control word which is changed in the course of time; and means for supplying to said video scrambling circuit the new control word and a command of using the new control word in said video scrambling circuit; and a sound part for processing digital sound data in the form of successive packets, said sound part being controlled by a second time base, which is not synchronous with the first time base, and comprising:

a sound scrambling circuit for scrambling a first part of each of the successive packets on the basis of a sound control word which is changed in the course of time, a second part of each of the successive packets remaining unscrambled;

means for incorporating a bit or a specific group of bits in the second part of a packet of the successive packets coming after the packet of the successive packets which is being processed when the command of using the new control word in said video scrambling circuit is supplied to said video scrambling circuit, the bit or specific group of bits indicating that the new control word is used for the scrambling of the first part of packets which will come later; and means for using the new control word in said sound scrambling circuit for scrambling the first part of packets of the successive packets subsequent to the packet in which the bit or specific group of bits is incorporated.

6. A transmitter as claimed in claim 5, wherein the digital sound data is transmitted in accordance with the NICAM standard.

7. A transmitter as claimed in claim 6, wherein each of said successive packets is constituted by a NICAM frame.

8. A transmitter as claimed in claim 6, wherein each of said successive packets is constituted by a NICAM sequence.

9. A receiver for receiving the scrambled television signal transmitted by an transmitter as claimed in claim 5, comprising:

means for receiving and deciphering a new control word;

a video part for processing an analog video signal, said video part being controlled by a first time base, and comprising:

a video descrambling circuit for descrambling the analog video signal on the basis of a video control word which is changed in time; and means for supplying to said video descrambling circuit the new control word and a command of using the new control word in said video descrambling circuit; and a sound part for processing digital sound data in the form of successive packets, said sound part being controlled by a second time base, which is not synchronous with the first time base, and comprising:

a sound descrambling circuit for descrambling the first part of each of the successive packets on the basis of a sound control word which is changed in time;

means for detecting the bit or specific group of bits in the second part of a packet of the successive packets, indicating that the new control word must be used for the descrambling of the first part of packets which will come later; and means for using the new control word in said sound descrambling circuit for descrambling the first part of packets of the successive packets subsequent to the packet in which the bit or specific group of bits is detected.

10. A receiver as claimed in claim 9, wherein the digital sound data is in accordance with the NICAM standard.

11. A receiver as claimed in claim 10, wherein each of said successive packets is constituted by a NICAM frame.

12. A receiver as claimed in claim 10, wherein each of said successive packets is constituted by a NICAM sequence.

* * * * *